G. G. JOHNSON.
VEHICLE WHEEL.
APPLICATION FILED JAN. 14, 1916.
1,192,526.
Patented July 25, 1916.
2 SHEETS—SHEET 1.
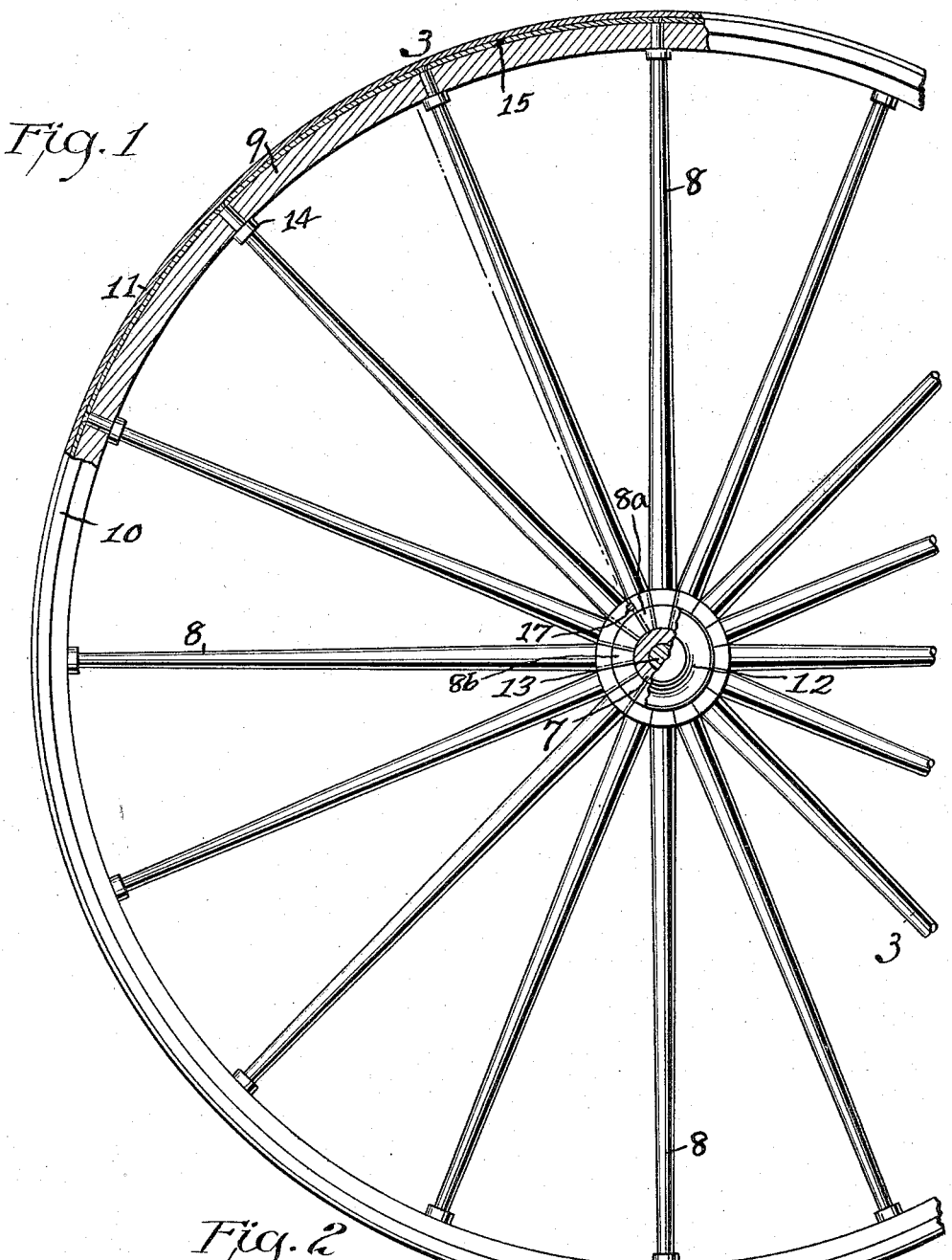
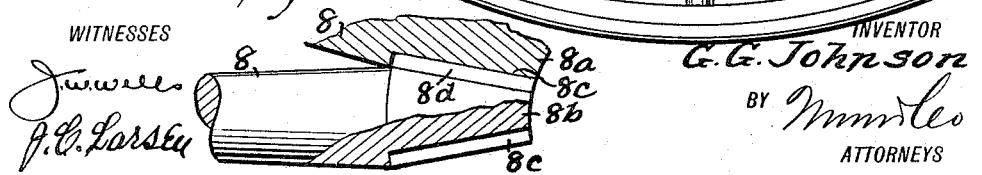

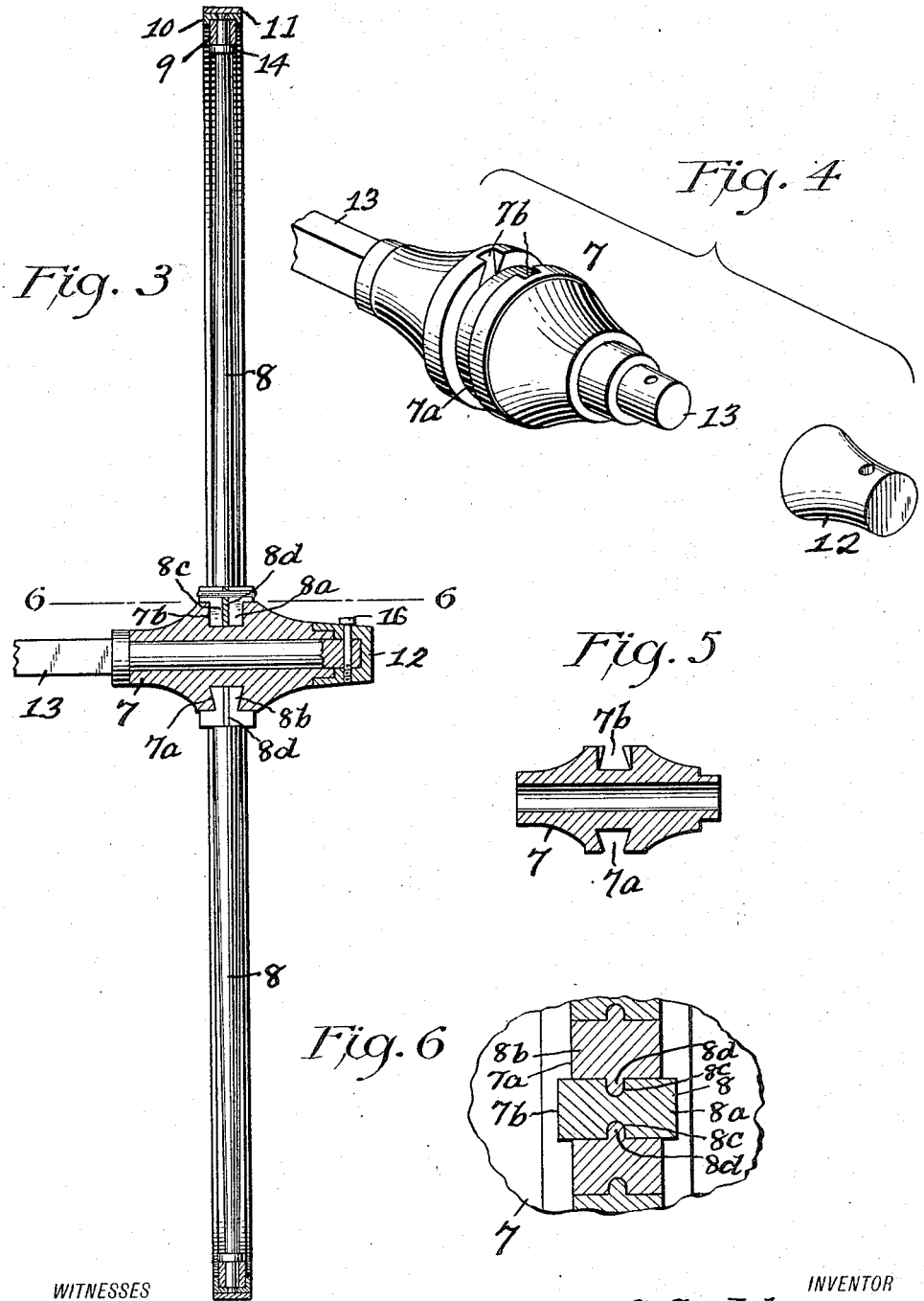

UNITED STATES PATENT OFFICE.

GEORGE GREEN JOHNSON, OF MUSKOGEE, OKLAHOMA.

VEHICLE-WHEEL.

1,192,526.

Specification of Letters Patent.   Patented July 25, 1916.

Application filed January 14, 1916.   Serial No. 72,066.

*To all whom it may concern:*

Be it known that I, GEORGE G. JOHNSON, a citizen of the United States, and a resident of Muskogee, in the county of Muskogee and State of Oklahoma, have invented certain new and useful Improvements in Vehicle-Wheels, of which the following is a specification.

My invention relates to vehicle wheels and one of the objects thereof is to provide means for quick and easy assembling a wheel in such a manner as to produce a light, strong, and comparatively inexpensive wheel and in which the load is carried by the upper portion of the felly as well as by the lower portion.

A further object is to provide a channel in the hub of dovetail shape in cross section for the reception of similarly formed ends of the spokes, whereby said spokes cannot be withdrawn radially from the hub, and a still further object is to provide means for insuring the rigidity of the spokes at their hub ends.

My invention is fully described in the following specification, of which the accompanying drawings form a part, in which like characters refer to like parts in each of the views, and in which:—

Figure 1 is a fragmentary side view of a wheel constructed in accordance with my invention, partly in section; Fig. 2 is an enlarged fragmentary view of the hub ends of two spokes, partly in section to show a detail; Fig. 3 is a section taken on the line 3—3 of Fig. 1; Fig. 4 is a perspective view of my hub and a cap for the outer end thereof; Fig. 5 is a sectional view of the hub; and Fig. 6 is an enlarged section taken on the line 6—6 of Fig. 3.

My wheel comprises a hub 7, spokes 8, a felly 9, a shield 10 therefor, a tire 11, and an end cap 12 to maintain the wheel upon an axle 13 upon which my wheel rotates.

The hub 7 is provided with a channel $7^a$ which is of dovetail formation within the hub for the greater portion of its length, a parallel sided entry $7^b$ intercepting the channel and of a width approximating the width of the spokes whereby said spokes may be assembled within the hub one at a time and slid along the channel.

The spokes are alike with the exception of the last one to be assembled, this having a parallel sided butt $8^a$ to fit within the entry $7^b$, whereas the remaining spokes have dovetailed butts $8^b$ to fit within the channel $7^a$ and be firmly held therein, these butts being clearly shown in Fig. 3.

As shown in Fig. 6 the spoke carrying the butt $8^a$ is provided with a longitudinally arranged channel or groove $8^c$ for the reception of similarly arranged ribs $8^d$ on the adjacent butts $8^b$ to insure rigidity of the spokes against movement with respect to each other, the butt $8^b$ immediately on one side of the butt $8^a$ having two ribs whereas all the rest have one rib and one channel and groove.

The outer end of each spoke is provided with a footing 14 against which the felly 9 bears, and the shield 10 is split at 15 to permit assembling over said felly. The spokes are continued through the shield 10 and upset at their ends to prevent withdrawal therefrom, thereby in effect suspending the hub from the upper portion of the shield, after which the tire 11 is shrunk on the shield. After the wheel has been slipped over the journal of the axle 13, the cap 12 is slipped over the axle end and firmly locked in place by means of a screw 16, said cap projecting over the outer end of the hub for protection against the entrance of dirt or water.

My wheel may be made of iron or wood and is very compact, light, strong, and highly efficient and, by reference to Fig. 1, it will be seen that I provide a locking pin 17 to prevent withdrawal of the spoke carrying the butt $8^a$ previous to applying the felly, shield, and tire, this pin resting in a bore the axis of which is on a line of division between the two adjacent butts.

Having fully described my invention, what I claim as new, and desire to secure by Letters Patent, is:—

1. A vehicle wheel, comprising a hub provided with a circumferential channel of dovetail form in cross section, said channel being intercepted by an entry slot having parallel sides, a plurality of spokes having beveled butts fitting said channel, a spoke having a parallel sided butt to fit said slot, and a felly at the outer ends of said spokes.

2. A vehicle wheel, comprising a hub provided with a circumferential channel of dovetail form in cross section, said channel being intercepted by an entry slot having parallel sides, a plurality of spokes having beveled butts fitting said channel, a spoke having a parallel sided butt to fit said slot, means for locking said spokes against lateral movement with respect to each other, and a felly at the outer ends of said spokes.

3. A vehicle wheel, comprising a hub provided with a circumferential channel of dovetail form in cross section, said channel being intercepted by an entry slot having parallel sides, a plurality of spokes having beveled butts fitting said channel, a spoke having a parallel sided butt to fit said slot, means for preventing relative spoke movement laterally comprising tongues and grooves on and in contacting butt surfaces, and a felly at the outer ends of said spokes.

In testimony whereof I have signed my name to this specification in the presence of two subscribing witnesses.

GEORGE GREEN JOHNSON.

Witnesses:
T. E. BASSHAM,
W. H. BROWN.

Copies of this patent may be obtained for five cents each, by addressing the "Commissioner of Patents, Washington, D. C."